United States Patent
Atieh et al.

(10) Patent No.: US 7,796,895 B2
(45) Date of Patent: Sep. 14, 2010

(54) METHOD AND SYSTEM FOR DYNAMIC DISPERSION COMPENSATION

(75) Inventors: Ahmad Atieh, Ottawa (CA); John Mills, Ottawa (CA)

(73) Assignee: BTI Systems Inc., Ottawa, Ontario (CA)

( * ) Notice: Subject to any disclaimer, the term of this patent is extended or adjusted under 35 U.S.C. 154(b) by 726 days.

(21) Appl. No.: 11/698,219

(22) Filed: Jan. 26, 2007

(65) Prior Publication Data

US 2008/0181615 A1    Jul. 31, 2008

(51) Int. Cl.
*H04B 10/12* (2006.01)
*H04B 10/00* (2006.01)

(52) U.S. Cl. .................. 398/159; 398/155; 398/158; 398/206

(58) Field of Classification Search .......... 398/25, 398/136, 155, 158, 206
See application file for complete search history.

(56) References Cited

U.S. PATENT DOCUMENTS

| | | | | |
|---|---|---|---|---|
| 5,659,412 A * | 8/1997 | Hakki | ........................ | 398/152 |
| 5,822,100 A * | 10/1998 | Robinson et al. | ............. | 398/147 |
| 5,859,939 A * | 1/1999 | Fee et al. | ........................ | 385/24 |
| 5,930,414 A * | 7/1999 | Fishman et al. | ................ | 385/11 |
| 6,104,515 A * | 8/2000 | Cao | ............................ | 398/147 |
| 6,271,952 B1 * | 8/2001 | Epworth | ...................... | 398/147 |
| 6,317,240 B1 | 11/2001 | Penninckx et al. | | |
| 6,583,903 B1 * | 6/2003 | Way et al. | .................... | 398/152 |
| 6,665,497 B1 * | 12/2003 | Hamilton-Gahart et al. | . | 398/135 |
| 6,678,431 B2 * | 1/2004 | Han et al. | ...................... | 385/11 |
| 6,721,512 B1 * | 4/2004 | Cao | ............................ | 398/159 |
| 6,744,991 B1 * | 6/2004 | Cao | ............................ | 398/147 |
| 6,823,142 B1 | 11/2004 | Tanaka et al. | | |
| 6,829,440 B2 | 12/2004 | Ooi et al. | | |
| 6,889,011 B1 | 5/2005 | Fee et al. | | |
| 6,895,188 B1 | 5/2005 | Shi et al. | | |
| 6,980,289 B2 | 12/2005 | Kotten et al. | | |
| 7,024,058 B2 | 4/2006 | Han et al. | | |
| 7,031,615 B2 * | 4/2006 | Gentile | ........................ | 398/155 |
| 7,043,122 B2 * | 5/2006 | Han et al. | ...................... | 385/37 |
| 7,079,777 B2 * | 7/2006 | Berger et al. | ................. | 398/159 |
| 7,206,522 B2 * | 4/2007 | Garcia et al. | ................. | 398/206 |
| 7,558,479 B1 * | 7/2009 | Robinson | ...................... | 398/28 |
| 2002/0018266 A1 * | 2/2002 | Ooi et al. | ...................... | 359/161 |
| 2002/0118422 A1 * | 8/2002 | Cao | ............................ | 359/161 |
| 2002/0126355 A1 * | 9/2002 | Bulow | ......................... | 359/161 |
| 2004/0190906 A1 * | 9/2004 | Jain | ............................ | 398/147 |

(Continued)

OTHER PUBLICATIONS

Civcom Xlight, http://www.civcom.com/Free_light.asp?MainID=10&Name=Free-Path%20Family, two pages.

(Continued)

*Primary Examiner*—Ken N Vanderpuye
*Assistant Examiner*—Tanya Ngo

(57) ABSTRACT

A dynamic dispersion compensation system and method are provided. The method dynamically compensates for dispersion in an optical signal by recovering a first clock and a second clock from a first polarization component and a second polarization component of the optical signal respectively, determining a delay time between the first clock and the second clock, determining the dispersion based on the delay time and dynamically compensating for the determined dispersion. The system comprises a polarization beam splitter, a clock recoverer, a dispersion determiner and a tunable dispersion compensation module and is operable to dynamically compensate for the dispersion in an optical signal.

12 Claims, 6 Drawing Sheets

U.S. PATENT DOCUMENTS

2007/0110451 A1* 5/2007 Rasmussen et al. ......... 398/158
2008/0141723 A1* 6/2008 Cocchini et al. ............... 65/381

OTHER PUBLICATIONS

Barnsley, P.E. et al., "All-optical clock recovery from 5 Gb/s RZ data using a self-pulsating 1.56 um laser diode," *IEEE Photonics Technology Letters*, 3(10):942-945, Oct. 1991.

Vlachos, K. et al., "30 Gb/s all-optical clock recovery circuit," *IEEE Photonics Technology Letters*, 12(6):705-707, 2000.

Yikai, S. et al., "Wavelength tunable all-optical clock recovery using a fiber parametric oscillator," *Lasers and Electro-Optics Society 1999 12th Annual Meeting, (LEOS '99)*, IEEE vol. 1, 8-11:351-352, Nov. 1999.

Salem, R. et al., "Broad-band optical clock recovery system using two-photon absorption", *IEEE Photonics Technology Letters*, 16(9):2141-2143, Sep. 2004.

Bintjas, C. et al., "Clock recovery circuit for optical packets," *IEEE Photonics Technology Letters*, 14(9):1363-1365, Sep. 2002.

* cited by examiner

METHOD AND SYSTEM FOR DYNAMIC DISPERSION COMPENSATION

FIELD OF THE INVENTION

The invention pertains to the field of optical dispersion compensation, and more particularly to dynamic optical dispersion compensation.

BACKGROUND OF THE INVENTION

In optical communication, optical signals are communicated through a transport medium in order to communicate information. Optical communication allows a great deal of information to be communicated over a single transport medium, for example over a single optical fiber. Unfortunately, non-idealities in the properties of a transport medium, such as temperature sensitivity, humidity sensitivity, physical deformation, discontinuities and a finite spectral bandwidth, can cause dispersion of an optical signal travelling through the transport medium. All forms of dispersion degrade an optical signal, reducing the data-carrying capacity through pulse-broadening.

One form of dispersion is chromatic dispersion (CD), which results from a variation in group delay with wavelength, and is affected by transport medium materials and dimensions. In optical fiber, the two primary mechanisms for chromatic dispersion are material dispersion and waveguide dispersion. Both of these mechanisms occur because all optical signals have a finite spectral width, and different spectral components will propagate at different speeds along the length of the fiber. Material dispersion results from the index of refraction of the fiber core being different for different wavelengths. Material dispersion is often the dominant source of chromatic dispersion in single-mode fibers. Waveguide dispersion results because the cross-sectional distribution of light within the fiber also changes for different wavelengths. Shorter wavelengths are more completely confined to the fiber core, while a larger portion of the optical power at longer wavelengths propagates in the cladding of the fiber. Since the index of refraction of the core is greater than the index of refraction of the cladding, this difference in spatial distribution causes a change in propagation velocity and hence group delay. Waveguide dispersion is generally relatively small compared to material dispersion. In single mode fiber, the fiber dimensions and properties are generally designed such that the waveguide dispersion effectively cancels out the material dispersion for a narrow band of channel wavelengths. However, in these fibers the waveguide dispersion only effectively cancels out the material dispersion under a narrow range of operating conditions. For example, physical deformation of the fiber, fluctuations in temperature and/or humidity may cause the properties of the fiber to change such that the waveguide dispersion and material dispersion no longer effectively cancel each other for the narrow band of channel wavelengths.

Another form of dispersion is polarization mode dispersion (PMD), which results from a phase delay between polarization states of an optical signal. Single-mode optical fiber and components support one fundamental mode, which generally consists of two orthogonal polarization modes. Ideally, the core of an optical fiber is perfectly circular, and therefore has the same index of refraction for both polarization states. However, mechanical and thermal stresses introduced during manufacturing, installation or by the operating environment result in asymmetries in the fiber core geometry. This asymmetry introduces small index of refraction differences for the two polarization states, which is a property called birefringence. Birefringence creates differing optical axes that generally correspond to a fast and slow axes. Birefringence causes one mode to travel faster than the other, resulting in a difference in the propagation time called the differential group delay (DGD).

In some cases, stress rods may be placed in the cladding of a single mode fiber to place stress on the fiber core such that one polarization plane is favoured over the other in order to limit the transmission to only one of the two polarization modes. This type of single mode fiber is known as polarization maintaining fiber, however, environmental stresses including thermal stresses and mechanical stresses can still cause deformation of the fiber, possibly negating the intended effects of the stress rods.

When power is exchanged among the propagating polarization modes, an effect which is known as mode coupling, both the polarization modes and the DGD are also wavelength dependent. Mode coupling is generally only present in long lengths of single-mode fiber, however it is also sometimes observed even in short optical components.

PMD effects resemble those of chromatic dispersion. However, chromatic dispersion is a linear effect that is generally rather stable, whereas, PMD is a linear effect that is time-varying.

When designing an optical network, designers must allow a dispersion margin that takes into account the amount of dispersion that will arise in the network. If the amount of dispersion exceeds the margin, the dispersion must be compensated for.

Relatively complicated schemes have been described which only dynamically compensate for PMD. For example, conventional dispersion compensation schemes have used dispersion shifted fibers and/or fiber bragg gratings, but have not taken into consideration dispersion caused by both chromatic dispersion and PMD and have similarly failed to consider changes in the dispersion over time due to environmental fluctuations and mechanical stresses.

SUMMARY OF THE INVENTION

According to one aspect of the present invention, there is provided a system comprising: a polarization beam splitter operable to split at least a portion of an optical signal into a first polarization component and a second polarization component; a clock recoverer operable to recover a first clock from at least a portion of the first polarization component, recover a second clock from at least a portion of the second polarization component and determine a delay time between the first clock and the second clock; a tunable dispersion compensation module; and a dispersion determiner operable to determine dispersion based on the delay time and operable to control the tunable dispersion compensation module to dynamically compensate for the dispersion determined by the dispersion determiner.

In some implementations, the dispersion determiner determines the dispersion according to:

$$D(\tau) = m\tau + b$$

wherein, $\tau$ is the delay time between the first clock and the second clock, $D(\tau)$ is the dispersion as a function of the delay time $\tau$, m is a linear scaling factor and b is a base dispersion.

In some implementations, the base dispersion b corresponds to chromatic dispersion.

In some implementations, the system further comprises: a first optical tap operable to pass a first portion of the first polarization component to a first input of a polarization beam combiner and to pass a second portion of the first polarization component to a first input of the clock recoverer; a second optical tap operable to pass a first portion of the second polarization component to a second input of the polarization beam combiner and to pass a second portion of the second polarization component to a second input of the clock recoverer; the polarization beam combiner operable to combine the first portion of the first polarization component and the first portion of the second polarization component to form a recombined signal; and the tunable dispersion compensation module acts on the recombined signal in order to dynamically compensate for the dispersion determined by the dispersion determiner.

In some implementations, the clock recoverer comprises: a clock recovery block; and a 2×1 switch operable to switch an input of the clock recovery block between the second portion of the first polarization component in order to recover the first clock and the second portion of the second polarization component in order to recover the second clock.

In some implementations, the clock recoverer comprises: a first clock recovery block operable to recover the first clock from the second portion of the first polarization component; and a second clock recovery block operable to recover the second clock from the second portion of the second polarization component.

In some implementations, the system further comprises: a first optical tap operable to pass a first portion of the optical signal to the tunable dispersion compensation module and to pass a second portion of the optical signal to the polarization beam splitter; and the tunable dispersion compensation module acts on the first portion of the optical signal in order to dynamically compensate for the dispersion determined by the dispersion determiner.

In some implementations, the clock recoverer comprises: a clock recovery block; and a 2×1 switch operable to switch an input of the clock recovery block between the first polarization component in order to recover the first clock and the second polarization component in order to recover the second clock.

In some implementations, the clock recoverer comprises: a first clock recovery block operable to recover the first clock from the first polarization component; and a second clock recovery block operable to recover the second clock from the second polarization component.

In some implementations, the system further comprises a polarization controller operable to align a polarization axis of the optical signal with the polarization axis of the polarization beam splitter.

According to another aspect of the present invention, there is provided a method comprising: splitting at least a portion of an optical signal into a first polarization component and a second polarization component; recovering a first clock from at least a portion of the first polarization component; recovering a second clock from at least a portion of the second polarization component; determining a delay time between the first clock and the second clock; determining dispersion based on the delay time; and dynamically compensating for the dispersion.

In some implementations, determining the dispersion based on the delay time comprises determining the dispersion according to:

$$D(\tau) = m\tau + b$$

wherein, τ is the delay time between the first clock and the second clock, D(τ) is the dispersion as a function of the delay time τ, m is a linear scaling factor and b is a base dispersion.

In some implementations, the base dispersion b corresponds to chromatic dispersion.

In some implementations, dynamically compensating for the dispersion comprises recombining a portion of the first polarization component and a portion of the second polarization component to form a recombined signal and dynamically compensating for dispersion on the recombined signal.

In some implementations, dynamically compensating for the dispersion comprises dynamically compensating for dispersion on a portion of the optical signal.

Other aspects and features of the present invention will become apparent, to those ordinarily skilled in the art, upon review of the following description of the specific embodiments of the invention.

BRIEF DESCRIPTION OF THE DRAWINGS

Embodiments of the invention will now be described in greater detail with reference to the accompanying diagrams, in which.

DETAILED DESCRIPTION

Various methods and systems to perform dynamic dispersion compensation are provided. The methods and systems recover a respective clock signals from each one of a first polarization component and a second polarization component of an optical signal in order to determine a delay time between the respective clock signals, which is used to determine dispersion of the optical signal. The dispersion is then dynamically compensated for.

One of the advantages to using recovered clock signals to determine the time delay between the two polarization components of an optical signal, as opposed to using the data pulses of the two polarization components directly, is that the clock signals include a consistent train of pulses, whereas the data pulses of the two polarization components may have long periods where no transitions or pulses are present, making it difficult to determine a delay time between corresponding pulses of the two polarization components.

The systems and methods described below have the advantage that they dynamically compensate for changes in the amount of dispersion due to time-varying effects such as temperature and humidity fluctuations, component age and thermal and mechanical stresses.

Figure 1:
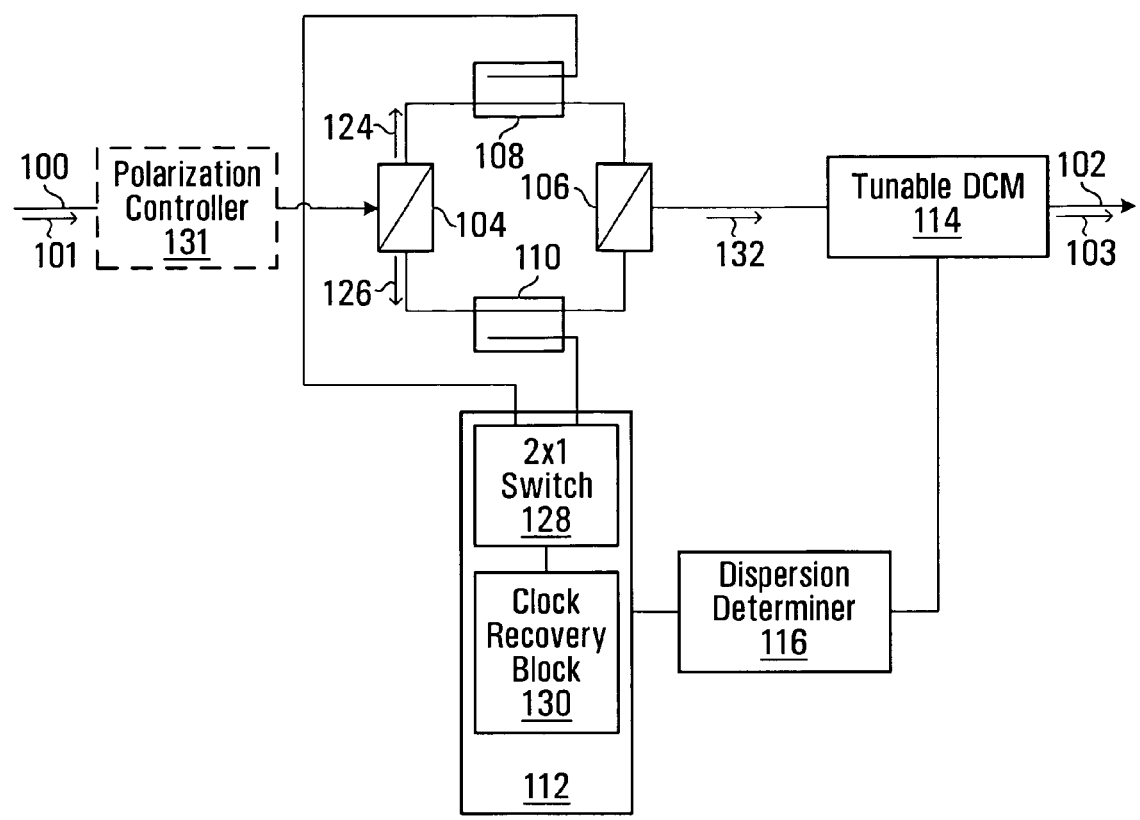
FIG. 1 is a block diagram of a dynamic dispersion compensation system in accordance with an embodiment of the invention.

FIG. 1 is a block diagram of an example of a dynamic dispersion compensation system in accordance with an embodiment of the invention. The dynamic dispersion compensation system has an optical input 100 and an optical output 102. The optical input 100 is functionally connected to an input of a polarization beam splitter (PBS) 104. The PBS 104 has a first output and a second output, which are functionally connected to an input of a first optical tap 108 and to an input of a second optical tap 110 respectively. The first optical tap 108 has a first output that is functionally connected to a first input of a polarization beam combiner (PBC) 106. The second optical tap 110 has a first output that is functionally connected to a second input of the PBC 106. The PBC 106 has an output that is functionally connected to an input of a tunable dispersion compensation module 114. The tunable dispersion compensation module 114 has an output that is functionally connected to the optical output 102. The first optical tap 108 has a second output that is functionally connected to a first input of a clock recoverer 112. The second optical tap 110 has a second output that is functionally connected to a second input of the clock recoverer 112. The clock recoverer 112 has a first output that is functionally connected to an input of a dispersion determiner 116. The dispersion determiner 116 has an output that is functionally connected to a control input of the tunable dispersion compensation module 114.

The clock recoverer 112 includes a 2×1 switch 128 and a clock recovery block 130. The 2×1 switch 128 has a first input functionally connected to the first input of the clock recoverer 112 and thus is functionally connected to the second output of the first optical tap 108. The 2×1 switch 128 also has a second input, which is functionally connected to the second input of the clock recoverer 112 and thus is functionally connected to the second output of the second optical tap 110. The 2×1 switch 128 has an output that is connected to an input of the clock recovery block 130.

In operation, an optical signal 101 received at the optical input 100 is split into a first polarization component 124 and a second polarization component 126 by the polarization beam splitter 104. The first polarization component 124 and the second polarization component 126 are passed to the first input of the first optical tap 108 and the first input of the second optical tap 110 respectively. The first optical tap 108 taps a first portion of the first polarization component 124 to its first output and taps a second portion of the first polarization component 124 to its second output. The second optical tap 110 taps a first portion of the second polarization component 126 to its first output and taps a second portion of the second polarization component 126 to its second output. The first portion of the first polarization component and the first portion of the second polarization component are recombined by the polarization beam combiner 106 to form a recombined signal 132.

The clock recoverer 112 recovers a first clock from the second portion of the first polarization component 124 and recovers a second clock from the second portion of the second polarization component 126. In the implementation shown in FIG. 1, the clock recovery block 130 may implement any type of clock recovery scheme that is capable of recovering a clock signal. For example, the clock recovery block 130 may be an all-optical clock recovery block, which is advantageous for high speed optical network systems. Several methods of all-optical clock recovery have been considered in the art. For example, all-optical clock recover based on self-pulsating laser diodes has been described in P. E. Barnsley, H. J. Wickes, G. E. Wickens, D. M. Spirit, "All-optical clock recovery from 5 Gb/s RZ data using a self-pulsating 1.56 um laser diode," IEE Photonics Technology Letters 3, 942 (1991), which is hereby incorporated by reference in its entirety. All optical clock recovery based on optically modulated semiconductor amplifier-based fiber lasers has been described in K. Vlachos, G. Theophilopoulos, A. Hatziefremidis, H. Avramopoulos, "30 Gb/s all-optical clock recovery circuit," IEEE Photonics Technology Letters 12, 705 (2000), which is hereby incorporated by reference in its entirety. S. Yikai, W. Lijun, P. Kumar, "Wavelength tunable all-optical clock recovery using a fiber parametric oscillator," Lasers and Electro-Optics Society 1999 12th Annual Meeting. LEOS '99. IEEE Volume 1, 8-11 Nov. 1999 describes all-optical clock recovery based on fiber parametric oscillators and is hereby incorporated by reference in its entirety. All-optical clock recovery using two-photon absorption in avalanche photodiodes is described in R. Salem, T. E. Murphy, "Broadband optical clock recovery system using two-photon absorption, IEEE Photonics Technology Letters 16, 2141 (2004), which is hereby incorporated by reference in its entirety. Another simple all-optical approach to clock recovery consists of using a Fabry-Perot cavity whose roundtrip time corresponds to the incident bit period, as described in C. Bintjas, K. Yiannopoulos, N. Pieros, G. Theophilopoulos, M. Kalyvas, J. Avramopoulos, G. Guekos, "Clock recovery circuit for optical packets," IEEE Photonics Technology Letters 14, 1363 (2002), which is hereby incorporated by reference in its entirety.

The clock recoverer 112 in FIG. 1 operates by switching the 2×1 switch 128 such that the input of the clock recovery block 130 is switched between the second portion of the first polarization component 124 to recover the first clock and the second portion of the second polarization component 126 to recover the second clock.

The clock recoverer 112 also determines a time delay $\tau$ between the first clock and the second clock. Any method of determining the phase difference between two clocks may be used to determine the time delay $\tau$ between the first clock and the second clock.

The clock recoverer 112 transmits the time delay $\tau$ to the dispersion determiner 116. The dispersion determiner 116 determines dispersion of the optical signal received at the optical input 100 based on the time delay $\tau$ reported by the clock recoverer 112. The dispersion determiner 116 then controls the tunable DCM 114 such that the tunable DCM 114 dynamically compensates for the dispersion of the optical signal received at the optical input 100, which was determined by the dispersion determiner 116, by adjusting the dispersion of the recombined signal 132. The tunable DCM 114 then outputs the dynamically dispersion compensated optical signal 103 at the optical output 102.

Figure 4:
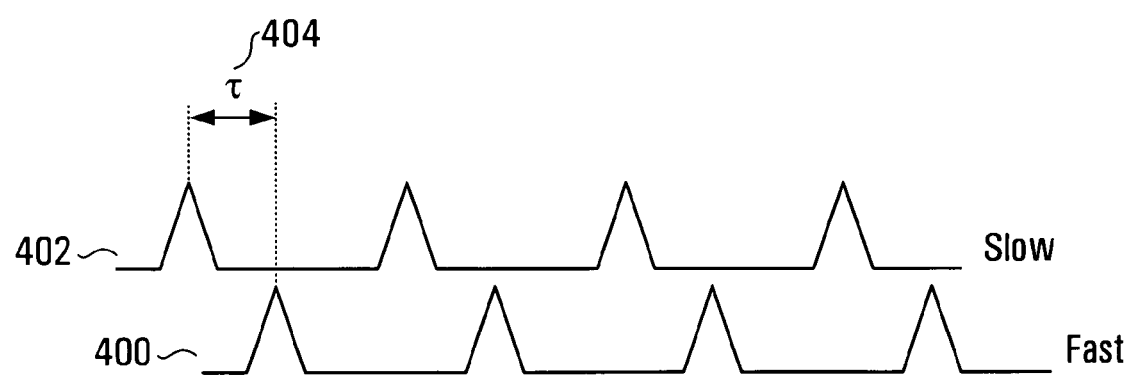
FIG. 4 is a plot of a slow clock and a fast clock recovered from an optical signal in accordance with an embodiment of the invention.

The time delay $\tau$ between the first clock and the second clock arises due to a difference in propagation velocity of the first polarization component and the second polarization component, and is a measure of polarization mode dispersion. Polarization mode dispersion may be caused by any of the factors discussed above. Polarization mode dispersion results in a "fast" polarization and a "slow" polarization. An example of a "fast" clock 400 recovered from a "fast" polarization and a "slow" clock 402 recovered from a "slow" polarization are shown in FIG. 4. FIG. 4 illustrates the time delay $\tau$ 404 between the "fast" clock 400 and the "slow" clock 402. The time delay $\tau$ 404 causes a pulse of the "fast" clock 400 to arrive earlier than the corresponding pulse of the "slow" clock 402.

Figure 5A:
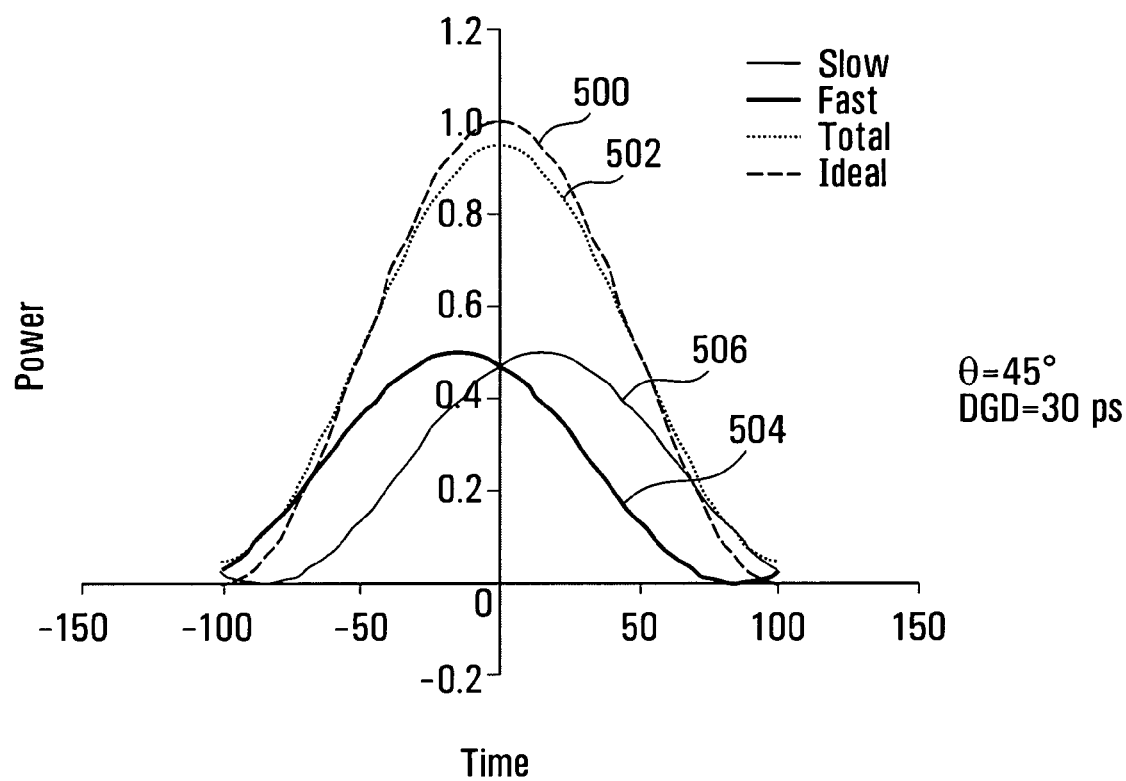
FIGS. 5A and 5B are plots illustrating examples of pulse broadening as a result of first order polarization mode dispersion.
Figure 5B:
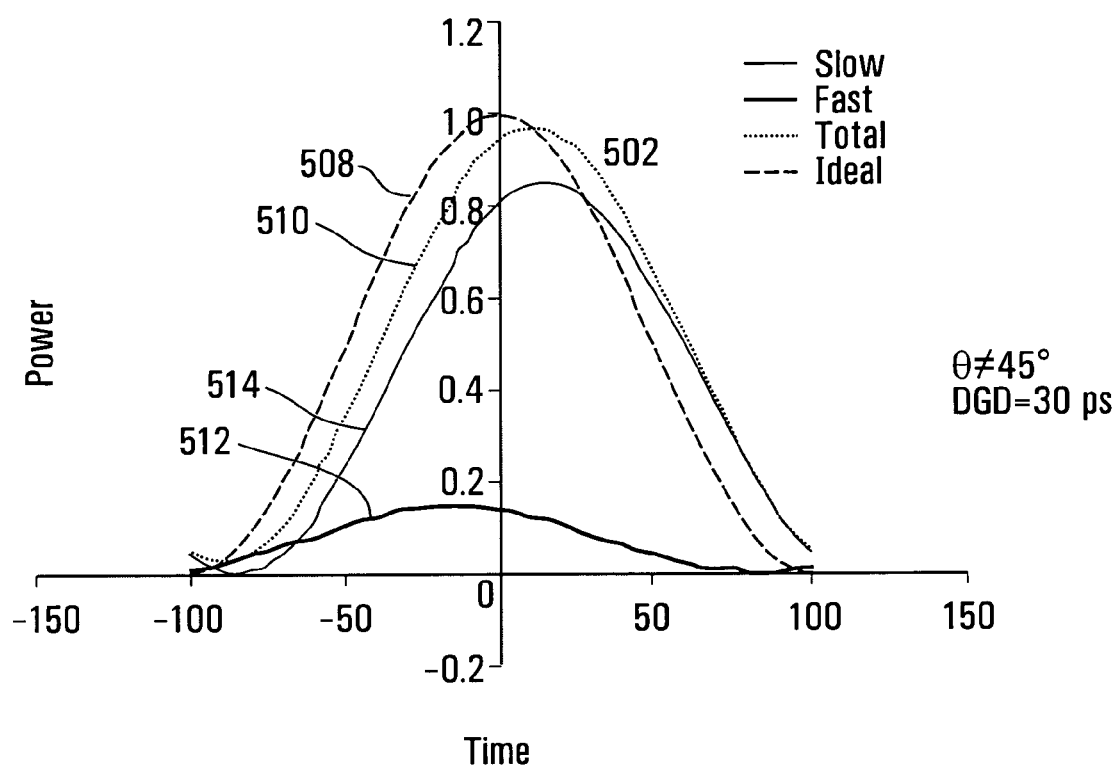

An example of pulse broadening caused by first order PMD is illustrated in FIGS. 5A and 5B. FIG. 5A illustrates the difference between an ideal pulse 500 and a pulse 502 with first order PMD. The first order PMD of the pulse 502 is such that the differential group delay (DGD) between a fast pulse 504 and a slow pulse 506, which make up the pulse 502, is 30 ps. FIG. 5B illustrates the difference between an ideal pulse 508 and a pulse 510 with first order PMD such that the differential group delay (DGD) between a fast pulse 514 and a slow pulse 514 is 30 ps.

The difference between FIG. 5A and FIG. 5B is that in FIG. 5A the principal states of polarization (PSP) of the pulse 502 have an angle θ=45° with the fast and slow polarization axes, such that the fast pulse 504 and the slow pulse 506 have equal power, while in FIG. 5B the PSP of the pulse 510 have an angle θ≠45 with the fast and slow polarization axes, such that the fast pulse 512 and the slow pulse 514 are of unequal power. In fact, in FIG. 5B the majority of the signal power is in the slow pulse 514, resulting in the pulse 510 arriving later than the ideal pulse 508. However, in both FIG. 5A and FIG. 5B, the DGD of 30 ps causes a broadening of the pulses 502 and 510 relative to the ideal pulses 500 and 508 respectively.

Assuming an input optical signal with an optical field with slowly varying electric amplitude of A(t) is transmitted through optical fiber with first order PMD such that the differential group delay has a value of τ, and assuming that the electrical field has an angle θ with the fast polarization axis of the optical fiber. Then at the output of the optical fiber the electric field will have the following form:

$$\vec{E}_{out}(t) = \cos\theta A\left(t + \frac{\tau}{2}\right)\hat{e}_{fast} + \sin\theta A\left(t - \frac{\tau}{2}\right)\hat{e}_{slow} \quad (1)$$

The output the optical intensity becomes $$I_{out}(t) = \cos^2\theta\left(A\left(t + \frac{\tau}{2}\right)\right)^2 + \sin^2\theta\left(A\left(t - \frac{\tau}{2}\right)\right)^2 \quad (2)$$

The RMS pulse width increment will be $$\Delta\tau = \gamma(1-\gamma)\tau^2 \quad (3)$$

where $$\gamma = \cos^2\theta \quad (4)$$

In some implementations, the dispersion determiner 116 determines the dispersion from the delay time τ determined by the clock recoverer 112 according to equations (3) and (4) above and the following equation:

$$D(\tau) = m\tau + b \quad (5)$$

where $$m = \Delta\tau \quad (6)$$

In equation (5), τ is the delay time determined by the clock recoverer 112, also known as the differential group delay (DGD), D(τ) is the dispersion as a function of the delay time τ, m is a scaling factor equal to the RMS pulse width increment Δτ calculated according to equations (3) and (4) above and b is a base dispersion.

While equations (1) to (4) above describe one way of determining the RMS pulse width increment Δτ and hence the scaling factor m in equations (5) and (6), in general, the equations to determine the scaling factor m are implementation specific details and may be any set of equations known in the art for determining the RMS pulse width increment Δτ from the delay time τ.

In some implementations, the base dispersion b in equation (5) corresponds to the relatively stable dispersion arising from chromatic dispersion. Chromatic dispersion is a wavelength dependent dispersion that generally has a dispersion slope, which means that the dispersion caused by chromatic dispersion has a relatively constant slope with respect to wavelength. In some implementations, the base dispersion b in equation (5) is determined according to a dispersion slope, such that the base dispersion b is different dependent on the channel wavelength being compensated.

The tunable DCM 114 may be any type of tunable DCM, for example CIVCOM Inc. produces a commercially available DCM under the product name TODC and TeraXion produces two commercially available DCMs under the product names ClearSpectrum-TDCM and ClearSpectrum-TDC. ClearSpectrum is a registered trademark of TeraXion.

In some implementations, the dispersion compensation system includes a polarization controller 131 that is functionally connected to the input of the polarization beam splitter 104 and is operable to align polarization axes of the polarization components of an optical signal 101 with the polarization axis of the polarization beam splitter 104.

Generally, a polarization beam splitter is a bidirectional device that is operable to either split an optical signal into two polarization components or combine two polarization components into an optical signal. Therefore, in some implementations, the polarization beam splitter 104 and the polarization beam combiner 106 are implemented with identical optical devices.

In an optical tap, such as the first optical tap 108 and the second optical tap 110, which taps a first portion of an input signal of the optical tap to a first output of the optical tap and taps a second portion of the input signal of the optical tap to a second output of the optical tap, the tap ratio of the optical tap is the ratio between the first portion of the input signal tapped to the first output and the second portion of the input signal tapped to the second output. The tap ratios of the first optical tap 108 and the second optical tap 110 are implementation specific details. In general, the first optical tap 108 and the second optical tap 110 tap a majority of the signal power of the first polarization component 124 and the second polarization component 126 to their respective first outputs, while only a minority of the signal power of the first polarization component 124 and the second polarization component 126 is tapped to their second outputs respectively. For example, in the implementation shown in FIG. 1 the tap ratio of the first optical tap 108 and the second optical tap 110 may be 95/5 or 90/10.

In FIG. 1, the first optical tap 108 and the second optical tap 110 are shown as fiber couplers, more generally any type of optical tap that is operable to pass a first portion of an optical signal to a first output and a second portion of the optical signal to a second output according to a tap ratio, as discussed above, may be used for the first optical tap 108 and the second optical tap 110.

In FIG. 1, the 2×1 switch 128 switches the input of the clock recovery block 130 between the second portion of the first polarization component and the second portion of the second polarization component in order to recover the first clock and the second clock respectively. In some implementations, rather than using a 2×1 switch and a single clock recovery block, two clock recovery blocks are provided to recover the first clock and the second clock respectively.

While the clock recoverer 112, dispersion determiner 116 and the tunable DCM 114 are shown as separate blocks in FIG. 1, in some implementations, the functionality of these blocks may be combined in one or more functional block or component. For example, in some implementations, a single component combines the functionality of the clock recoverer 112 and the dispersion determiner 116, such that the single component recovers the first clock and the second clock, determines the time delay between the first clock and the second clock, determines the dispersion based on the time delay between the first clock and the second clock and controls the tunable DCM 114 to dynamically compensate for the determined dispersion.

The example implementation of a dynamic dispersion compensation system shown in FIG. 1 may be used anywhere within an optical network, particularly wherever dispersion compensation is required to remain within the dispersion margin allocated by the network designer. For example, the example implementation of a dynamic dispersion compensation system shown in FIG. 1 may be implemented in optical receivers and/or optical repeaters in an optical network.

Figure 2:
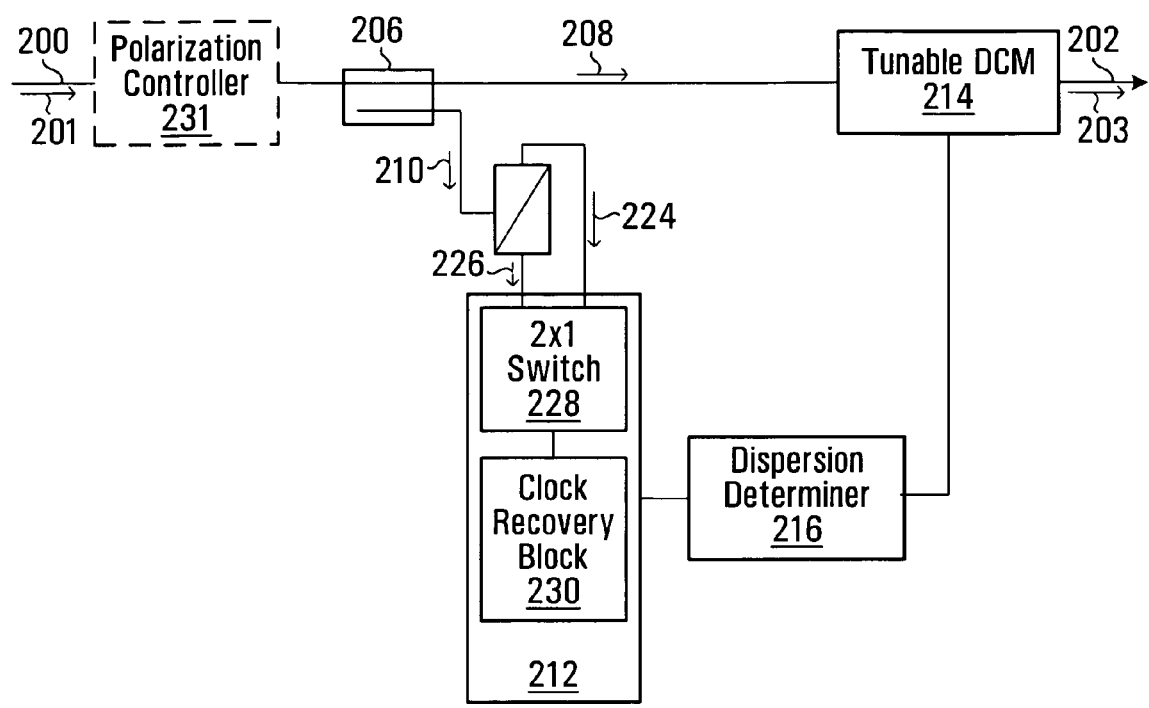
FIG. 2 is a block diagram of a dynamic dispersion compensation system in accordance with an embodiment of the invention.

Another example of a dynamic dispersion compensation system in accordance with an embodiment of the invention is shown in a block diagram in FIG. 2. The dynamic dispersion system shown in FIG. 2 is similar to the dynamic dispersion system shown in FIG. 1, however in FIG. 2, the dynamic dispersion system has one less optical tap and does not include a polarization beam combiner, which reduces the components of the system and thus may reduce the cost of producing the system.

The dynamic dispersion system shown in FIG. 2 has an optical input 200 and an optical output 202. The optical input 200 is functionally connected to an input of an optical tap 206. A first output of the optical tap 206 is functionally connected to a first input of a tunable DCM 214, while a second output of the optical tap 206 is functionally connected to an input of a polarization beam splitter 204. A first output and a second output of the polarization beam splitter 204 are functionally connected to a first input and a second input of a clock recoverer 212 respectively. The clock recoverer 212 includes a 2×1 switch 228 and a clock recovery block 230. The first input and the second input of the clock recoverer 212 are functionally connected to a first input and a second input of the 2×1 switch 228 respectively. An output of the clock recoverer 212 is functionally connected to an input of a dispersion determiner 216. An output of the dispersion determiner 216 is functionally connected to a second input of the tunable DCM 214. An output of the tunable DCM 214 is functionally connected to the optical output 202 of the dynamic dispersion compensation system.

In operation, a first portion 208 and a second portion 210 of an optical signal 201 received at the optical input 200 are tapped off to the tunable DCM 214 and the polarization beam splitter 204 respectively by the optical tap 206. The polarization beam splitter 204 splits the second portion 210 of the optical signal 201 into a first polarization component 224 and a second polarization component 226. The first polarization component 224 and the second polarization component 226 are passed to the clock recoverer 212. The operation of the clock recoverer 212, the dispersion determiner 216 and the tunable DCM 214 shown in FIG. 2 are identical to the operation of the clock recoverer 112, the dispersion determiner 216 and the tunable DCM 114 described above with regard to FIG. 1. Briefly, in the dynamic dispersion compensation system shown in FIG. 2, the clock recoverer 212 recovers the fast clock and the slow clock and determines a time delay τ between the fast clock and the slow clock, the dispersion determiner 216 determines a dispersion based on the time delay τ and the tunable DCM 214 dynamically compensates for the dispersion by acting on the second portion 208 of optical signal 200 in order to produce a dynamically dispersion compensated optical signal 203.

In some implementations, a polarization controller 231 is functionally connected between the optical input 200 and the input of the optical tap 206 and is operable to align polarization axes of the polarization components of the optical signal 201 with the polarization axis of the polarization beam splitter 204.

The tap ratio of the optical tap 206 is an implementation specific detail. In general, the tap ratio between the first output and the second output of the optical tap 206 is such that a majority of an optical signal received at the input of the optical tap 206 is tapped off to the first output, while only a small portion of the optical signal is tapped off to the second output. For example, the tap ratio of the optical tap 206 may be 90/10 or 95/5.

In the example embodiments of a dynamic dispersion compensation system shown in FIGS. 1 and 2, it has been assumed that the input optical signals 101 and 201 respectively include only one wavelength channel. Alternatively, if the input optical signals 101 and 201 are wavelength division multiplexed optical signals, a tunable optical filter may be used at the optical inputs 100 and 200 to select a single wavelength channel.

Figure 3:
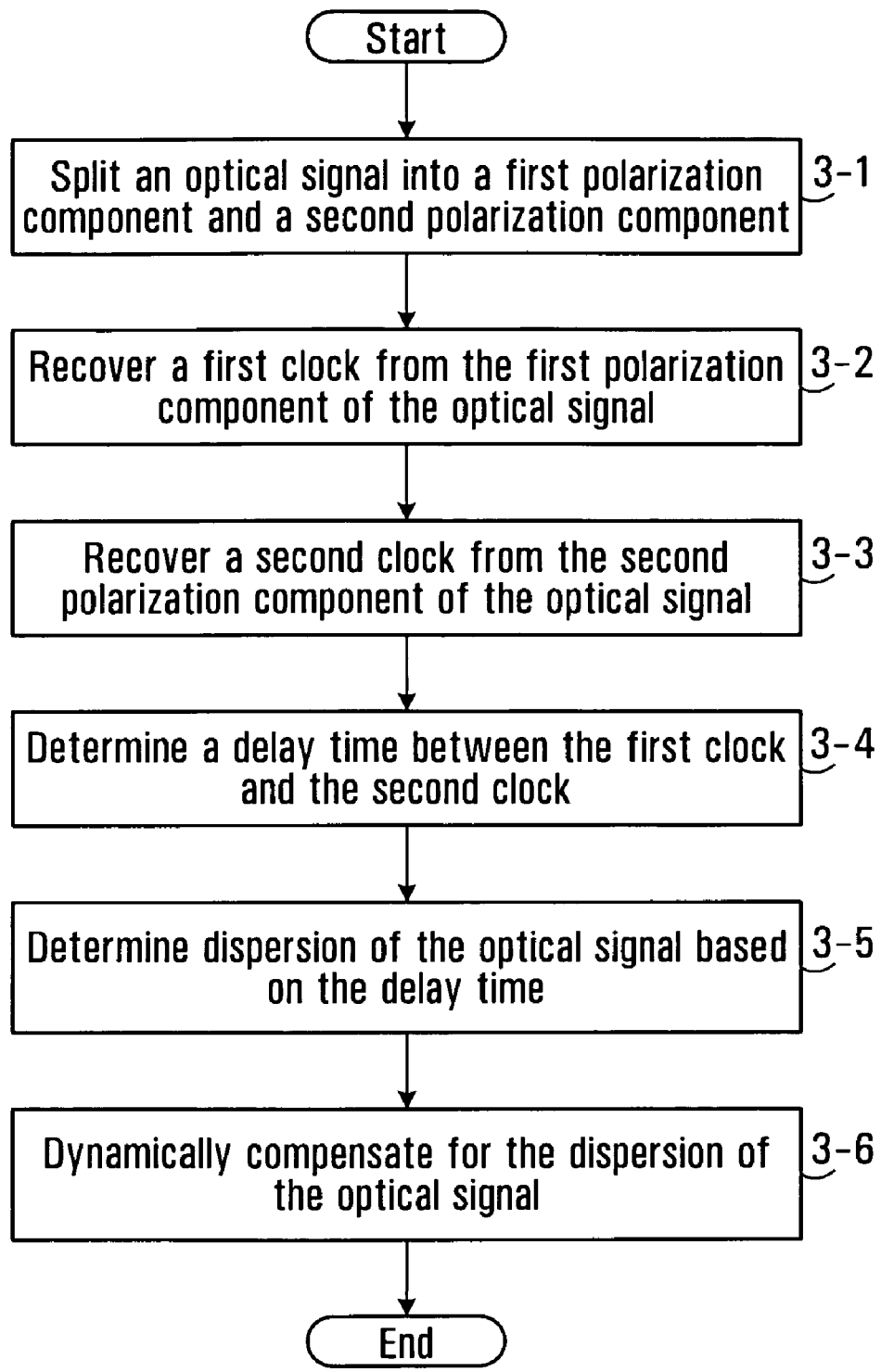
FIG. 3 is a flow chart of a method for dynamic dispersion compensation in accordance with an embodiment of the invention.

An example of a method of dynamic dispersion compensation is shown in a flow chart in FIG. 3. The method dynamically compensates for dispersion in an optical signal by determining the dispersion in the optical signal and then dynamically compensating for it.

The method begins at step 3-1 in which an optical signal is split into a first polarization component and a second polarization component. In step 3-2 a first clock is recovered from the first polarization component of the optical signal. In step 3-3, a second clock is recovered from the second polarization component of the optical signal. In step 3-4, a delay time between the first clock and the second clock is determined. In step 3-5, dispersion of the optical signal is determined based on the delay time. In step 3-6, the dispersion of the optical signal is dynamically compensated for.

The flow chart of the example method of dynamic dispersion compensation shown in FIG. 3 is merely exemplary. The steps of the methods may be re-ordered and/or steps may be added or removed. For example, in some implementations, the step of recovering the first clock and the step of recovering the second clock are combined in a single step in which the first clock and the second clock are recovered simultaneously.

In some implementations, the optical signal is tapped into a first portion and a second portion and the second portion of the optical signal is split into a first polarization component and a second polarization component in step 3-1.

In some implementations, the step of determining the dispersion of the optical signal based on the delay time includes determining the dispersion based on equation (1).

What has been described is merely illustrative of the application of the principles of the invention. Other arrangements and methods can be implemented by those skilled in the art without departing from the spirit and scope of the present invention.

The invention claimed is:

1. A system comprising:
   a polarization beam splitter operable to split an input optical signal into a first polarization component and a second polarization component;
   a clock recoverer operable to recover a first clock from the first polarization component, recover a second clock from the second polarization component and determine a delay time between the first clock and the second clock;
   a tunable dispersion compensation module;
   a dispersion determiner operable to determine dispersion based on the delay time and operable to control the tunable dispersion compensation module to dynamically compensate for the dispersion determined by the dispersion determiner; and a polarization beam combiner operable to combine the first polarization component and the second polarization component to form a recombined signal;

wherein the tunable dispersion compensation module is configured to act on any one of:

a) the recombined signal; and b) the input optical signal, in order to dynamically compensate for the dispersion determined by the dispersion determiner.

2. The system of claim 1, wherein the dispersion determiner determines the dispersion according to:

$$D(\tau)=m\tau+b$$

wherein, $\tau$ is the delay time between the first clock and the second clock, $D(\tau)$ is the dispersion as a function of the delay time $\tau$, m is a linear scaling factor and b is a base dispersion.

3. The system of claim 2, wherein the base dispersion b corresponds to chromatic dispersion.

4. The system of claim 1 further comprising a polarization controller operable to align a polarization axis of the input optical signal with the polarization axis of the polarization beam splitter.

5. A method comprising:

splitting an input optical signal into a first polarization component and a second polarization component;

recovering a first clock from the first polarization component;

recovering a second clock from the second polarization component;

determining a delay time between the first clock and the second clock;

determining dispersion based on the delay time;

recombining the first polarization component and the second polarization component to form a recombined signal; and dynamically compensating for the determined dispersion by acting on any one of:

a) the recombined signal; and b) the input optical signal.

6. The method of claim 5, wherein determining the dispersion based on the delay time comprises determining the dispersion according to:

$$D(\tau)=m\tau+b$$

wherein, $\tau$ is the delay time between the first clock and the second clock, $D(\tau)$ is the dispersion as a function of the delay time $\tau$, m is a linear scaling factor and b is a base dispersion.

7. The method of claim 6, wherein the base dispersion b corresponds to chromatic dispersion.

8. The system of claim 1, further comprising:

a first optical tap operable to pass a first portion of the first polarization component to a first input of the polarization beam combiner and to pass a second portion of the first polarization component to a first input of the clock recoverer; and a second optical tap operable to pass a first portion of the second polarization component to a second input of the polarization beam combiner and to pass a second portion of the second polarization component to a second input of the clock recoverer, wherein the polarization beam combiner is operable to combine the first portion of the first polarization component and the first portion of the second polarization component to form the recombined signal.

9. The system of claim 2, wherein the clock recoverer comprises:

a clock recovery block; and a 2×1 switch operable to switch an input of the clock recovery block between the second portion of the first polarization component in order to recover the first clock and the second portion of the second polarization component in order to recover the second clock.

10. The system of claim 2, wherein the clock recoverer comprises:

a first clock recovery block operable to recover the first clock from the second portion of the first polarization component; and a second clock recovery block operable to recover the second clock from the second portion of the second polarization component.

11. The system of claim 1, wherein the tunable dispersion compensation module is configured to act on the recombined signal in order to dynamically compensate for the dispersion determined by the dispersion determiner.

12. The method of claim 5, wherein dynamically compensating for the determined dispersion comprises dynamically compensating for the determined dispersion by acting on the recombined signal.

* * * * *